(Model.)

M. G. HUBBARD, Jr.
GRAIN BINDER.

No. 332,534. Patented Dec. 15, 1885.

Witnesses.
F. L. Ouraud
W. H. Row

Inventor.
Moses G. Hubbard Jr.
by Alex Mahon
Attorney

N. PETERS, Photo-Lithographer, Washington, D. C.

(Model.)

M. G. HUBBARD, Jr.
GRAIN BINDER.

Patented Dec. 15, 1885.

Witnesses:
F. L. Ourand
W. H. Rowe

Inventor:
Moses G. Hubbard Jr.
by Alex Mahon
Attorney

N. PETERS, Photo-Lithographer, Washington, D.C.

(Model.)

M. G. HUBBARD, Jr.
GRAIN BINDER.

No. 332,534. Patented Dec. 15, 1885.

Witnesses:
W. H. Rowe
Jno. R. Young

Inventor:
Moses G. Hubbard Jr.
by Alex Mahon
Attorney (Model.)

M. G. HUBBARD, Jr.

GRAIN BINDER.

No. 332,534. Patented Dec. 15, 1885.

WITNESSES
W. H. Row
Jno. R. Young

INVENTOR
Moses G. Hubbard Jr.
by Alex Mahm
Attorney

UNITED STATES PATENT OFFICE.

MOSES G. HUBBARD, JR., OF NORRISTOWN, PENNSYLVANIA.

GRAIN-BINDER.

SPECIFICATION forming part of Letters Patent No. 332,534, dated December 15, 1885.

Application filed October 10, 1883. Serial No. 102,678. (Model.)

*To all whom it may concern:*

Be it known that I, MOSES G. HUBBARD, Jr., of Norristown, county of Montgomery, State of Pennsylvania, have invented new and useful Improvements in Grain-Binders, of which the following is a full and exact description, reference being had to the accompanying drawings, making part of this specification.

My invention relates to that class of grain-binders that employ twine as a binding material; and it consists, generally, in a novel construction and arrangement of binder-arm and knotter with means for operating them separately and jointly in a peculiar manner, whereby the binder-arm is freely and quickly operated at a suitable interval to close the grain-passage during the delivery of the grain to the binder and remains closed while the knotter is forming the knot, and is then rapidly withdrawn therefrom, to prevent entanglement of the grain.

The invention further consists in novel devices for guiding, holding, gripping, and presenting the strands of twine to the knotter, and releasing them when the twine is cut, whereby but little power is employed to effectually perform the various operations above referred to.

The invention further consists in a novel mode of suspending, swinging, or hanging the knotter to the fixed part of a grain-binder, and imparting to it a lateral oscillating or vibrating motion at suitable intervals, whereby the twine is drawn from its direct line by the knotter, to enable the twine to be wrapped around the knotter-jaws to form the knot, and also a vertical vibrating motion, to permit the knotter-frame to be raised toward the bundle while the knot is being formed, and thereby obtain sufficient length of twine to form the knot without exerting additional or undue strain upon the binder, the mechanism for producing said vibrations of the knotter serving to actuate the gripper, knotter, and other instrumentalities for holding the twine and forming the knot.

The invention further consists in a peculiarly constructed and operating knotter and auxiliary mechanism for looping the twine, stripping, completing, and cutting the knot, wherein a knotter is used formed of a fixed jaw and a hinged jaw connected with each other, the entire knotter caused to revolve alternately in opposite directions.

The invention further consists in an improved twine holder and tension device, to enable the twine to be freely drawn from the ball and passed beneath an elastic and adjustable plate that bears upon the twine at two points, and permits irregular or knotty places to pass the tension device uninterruptedly and with regularity.

The invention further consists in the general arrangement of parts, to peculiarly adapt my invention to a gleaner and binder, and to an improved construction and arrangement of of sills, driving-shaft, scrolls, and double-ejector arms arranged to sweep closely upon each side of the scrolls and deliver the bundle from the machine without carrying loose straw around with said arms and wrapping it around the shaft, all of the improved methods and means being hereinafter fully described, and specifically set forth in the claims.

In the accompanying drawings.

Figure 1:
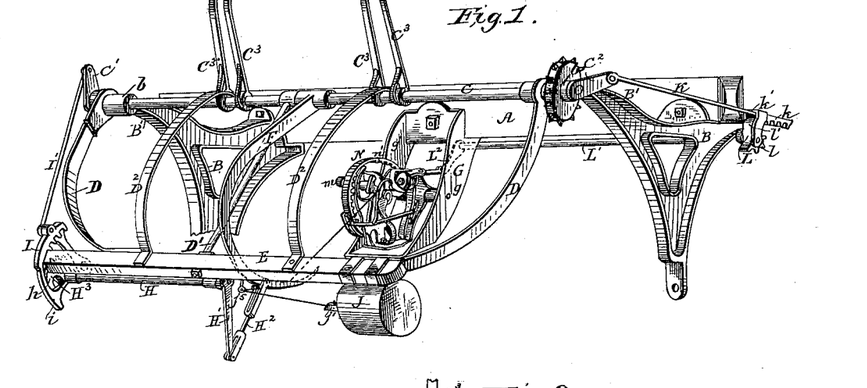
Figure 1 is a perspective view of a grain-binder mechanism and auxiliary devices adapted to be connected with and form part of a gleaner and binder.
Figures 2, 6, 7, 15:
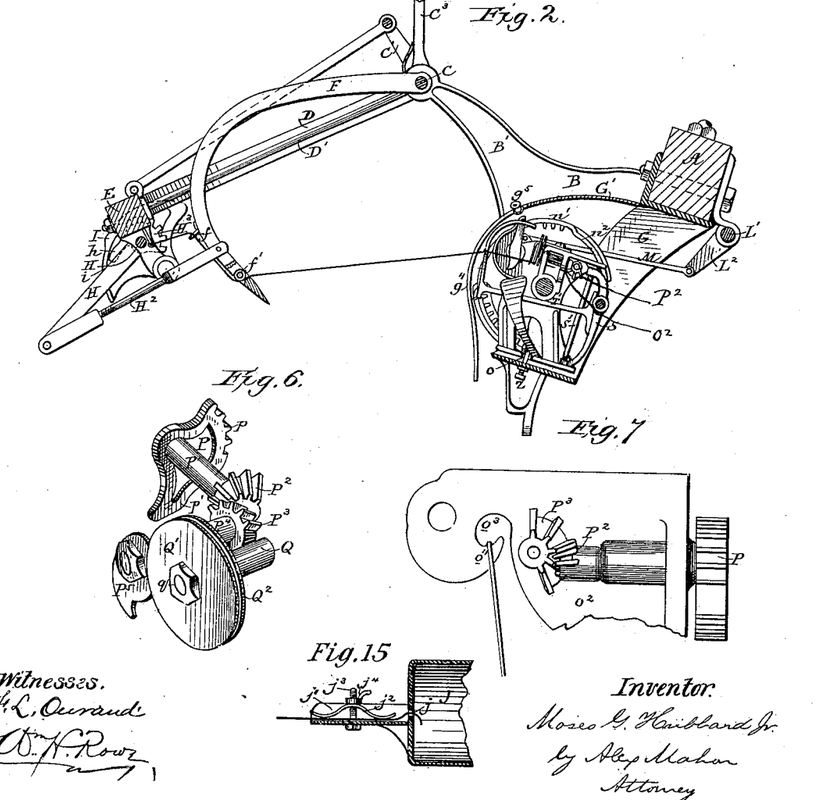
Fig. 2, a vertical central transverse sectional view of the same, taken a little to one side of the binder-arm and knotter.
Fig. 6, a perspective view of the gripper-hook, revoluble disks, and gearing for operating the same.
Fig. 7, an enlarged elevation, in detail, of the rear part of the binder-frame, showing the gearing for operating the gripper-hook and the twine-holder notch or hook at the rear of the grippers.
Fig. 15, a sectional view of the end of the twine-holder, showing the tension-spring for holding the twine at two points as it passes beneath it.

I will now proceed to describe in detail the construction and operation of my improved machine. The first two figures of the drawings show the fundamental parts of a gleaner that co-operate immediately with the binding mechanism to carry the twine around the bundle, tie the knot, and eject the bundle or sheaf from the machine, and wherein the main sill A is supported by brackets B, secured at their lower ends either directly or indirectly to the main or supporting axle of the machine. The brackets B have arms B' projecting to the rear of the machine, and are provided with bearings $b$, that support a horizontal main shaft, C, that serves to operate the needle-arm and binder mechanism at suitable intervals and impart to the ejector-arms $C^3$ a constant revolution with the shaft. Suspension-arms D, secured to the brackets B, project downwardly and backwardly, and serve as a secure support for the rear sill, E, to the ends of which the arms D are firmly secured. The rear sill is also braced by a tie-rod, D', bolted at its lower end to the sill, and journaled to the main shaft at its upper end. A binder-arm, F, is loosely journaled to the main shaft C, to swing across the space formed between the main sill, brackets, main shaft, suspension-arms, and rear sill. A shoe or bracket, G, is firmly secured to and suspended beneath the main sill A, immediately opposite the binder-arm, and supports the knotting and holding mechanism, hereinafter described, in such manner that the twine is drawn by the needle-arm backward and forward across the space between the main sill and rear sill of the machine, and thereby carries the twine completely around the grain, that is raised above or within said space by any well-known or desired means.

As the binder-arm is loosely journaled upon the shaft, it is not affected directly by the revolutions of said shaft, but receives an intermittent accelerated oscillation from a secondary shaft, H, supported directly beneath and parallel with the rear sill, E, and extends from one of its ends to the middle of the rail or to a point immediately opposite the binder-arm. A crank-arm, H', is secured to the inner end of the shaft H, and is connected at its free or vibrating end by means of a link, $H^2$, with the lower or free end of the binder-arm F, the crank and link being of such length and proportion that the lower end or point of the needle-arm is drawn back, when in its normal position, sufficiently far to leave a clear and unobstructed passage for the rising grain that is raised to be bound, and when the needle-arm is pushed forward will present the twine fairly to the gripper or twine-holder of the binder mechanism. The secondary or binder-arm shaft H has a segment-pinion, $H^3$, secured to its outer end, that is oscillated alternately in opposite directions, at suitable intervals, by means of a large segment-rack, I, pivoted on the frame, that is connected by a pitman, I', with a crank, C', on the end of the main shaft C, and receives an oscillating motion from the said constantly-rotating crank. A wing or delay surface, $h$, on the segment-pinion rests upon the smooth or delay surface $i$ of the segment-rack and permits the segment-rack to oscillate in both directions a considerable distance without imparting motion to the secondary shaft, and as the radius of the segment-rack is greater than the radius of the segment-pinion, and as the segment-rack is pivoted eccentrically to the pinion, it will be seen that a rapid movement is imparted to the binder-arm shaft for a short interval during the rotation of the main shaft. When the binder-arm has been swung completely across from the rear sill to the binder, the crank-arm C' will be passing its dead-center, and the movement of the segment-rack will have nearly ceased, and will first be shoved down and then slowly commence to move backward to the secondary shaft and binder-arm until the dead-center of the crank C' shall have been fairly passed, and thereby allow a short period of partial rest or suspension to the movement of the binder-arm, to insure the perfect operation of the twine-gripping and binding mechanism. When the crank C' shall have fairly passed its dead-center, the segment-rack will be rapidly oscillated, and, through the segment-pinion, binder-shaft, crank-arm, and link, will operate to withdraw the point of the binder-arm rapidly backward from the binder mechanism to the rear sill, and by its quick movement pass freely over the grain that has been raised beneath it without danger of entanglement with it. It will be readily perceived that when the needle-arm is pushed forward to carry the twine to the binder mechanism a rigid barrier is formed above the rising grain and beneath the bundle or gavel embraced by the binder-arm by the expansion or unfolding of the binder-arm, crank, and pitman, by which means the grain cannot rise behind the binder-arm when it is thrust forward, and thus impede its free backward movement. The main shaft C has a crank, $C^2$, secured to it at or about right angles to the crank C' upon the opposite end of said main shaft. A pitman, K, is joined at one end to the crank-arm $C^2$, and is provided with a toothed or rack portion, $k$, at its extreme outer end, and has a flattened surface, $k'$, between the rack and pitman-rod, the said toothed rack and flat surface being held tangent to a similar toothed portion, $l$, and flat surface $l'$ of a segment-pinion, L, secured to the outer end of a binder-operating shaft, L', that extends alongside of the main sill A to about one-half its length. A crank-arm, $L^2$, is secured to the inner end of said shaft L', and oscillates with it. A pitman or rod, M, connects the end of the crank-arm $L^2$ with a pin, $m$, and a radial arm, $n$, of an oscillating segment-wheel, N, that operates the binder mechanism. The segment-wheel N is secured to a shaft, N', that has bearings in the hub $o$ in a frame, O, suspended between the side plates and foot of the shoe G, secured to the main sill of the machine, formed with an internal gear-section, $n'$, and delay-surface $n^2$ upon the front edge of the rim, that engages with the teeth $p$ and flattened surface $p'$ of the segment-pinion P, in a manner similar to the segment rack and pinion for operating the needle-arm shaft, and imparts an oscillating intermittent motion to the shaft P' of a segmental beveled pinion, $P^2$, that is supported in bearing $o'$ in the binder-frame O. The beveled pinion $P^2$ intermeshes with a similar pinion, $P^3$, of a counter-shaft, $P^4$, supported in bearings $o^2$ of the frame O, and serves to oscillate said shaft, upon the outer end of which is secured a gripper-hook, $P^5$, to oscillate therewith. A short shaft, Q, arranged parallel to the shaft $P^4$, turns freely in bearings $o^2$ $o^2$ of the frame O, and has secured to its rear end by a screw-nut, $q$, a pair of circular disks, Q' $Q^2$, separated a short distance from each other by a sleeve, $q'$, that fits upon the shaft Q, by which means the disks are securely held upon their shaft a suitable distance to admit of the entrance of the toe of the gripper-hook, together with the overlapping twine between the disks, the said disks being of steel and sufficiently elastic to slightly spread apart as the twine is compressed between them and the gripper-hook and hold the twine with an elastic pressure. The sleeve $q'$ may be of rubber; or a rubber washer may be placed between the nut $q$ and the disk Q', to facilitate the above-described object. As the disks Q' $Q^2$ are free to revolve in both directions with their shaft, but little power is required to grip and release the twine from between the gripper-hook and the disks.

Figure 8:
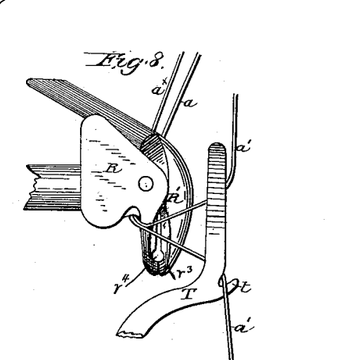
Fig. 8, a plan view of the knotter-bill and twine-holder when the knotter-bill has made the first part of its forward movement and has withdrawn the twine from its direct line.

The front plate, $o^2$, of the knotting-mechanism frame, between which and the knotter the gripper is arranged, is formed with an eye, $o^3$, and a twine-holding hook, $o^4$, that receives the twine as it is carried forward past the gripper by the binder-arm and holds it in proper position to be caught by said gripper. A tying-bill or knotter-hook, R, is arranged to revolve alternately in opposite directions immediately in rear of and in close proximity to the gripper and wrap it upon the hook to form the knot, as will hereinafter appear. In order that the knotter-hook may swing laterally to draw the twine from its direct line, as shown in Fig. 8, so that it may wrap it upon the hook, and, furthermore, to permit the knotter to be raised toward the bundle as it winds the twine around itself and form the knot close up to the compressed grain without employing an unnecessary amount of twine for the formation of the knot, the knotter-frame O is formed with top plate, O', and bottom, $O^2$, that project toward the main sill and front of the machine, and are pivoted to a yoke, S, by means of a bolt, S', that passes through the ends of the plates O' $O^2$. The yoke S is formed with a long bearing, $S^2$, at right angles to the bolt S', that extends from the side plate $g$ to the side plate $g'$ of the shoe G, and turns freely upon or with a bolt or stationary shaft, $S^3$, secured to or journaled in the side plates of the shoe G, by which means the knotter-frame, and with it the knotter, may receive both a lateral and vertical movement. In order to secure a lateral movement and draw the twine from its direct line, a cord-guide, T, projects upward from a rod, T', securely bolted to the yoke S, to rise and fall with the knotter-frame, but to retain a fixed position horizontally in relation to the knotter-frame. The cord-guide T extends up and encircles the path of the knotter, by which means the twine cannot become entangled with the knotter and its connections, and the guide is formed with a lip or hook, $t$, upon its outer side, arranged upon a line with the eye $o^3$ of the twine-hook $o^4$ at the front of the binder-frame, by which means the twine is supported in a direct line within reach of the knotter. A twine guide-plate, U, secured to the bottom plate, $O^2$, of the binder-frame, curves inward to the point of the knotter, and insures the passage of the twine beneath and around its jaws, when it is in its normal position. The twine will be caught by the jaws of said knotter, as it begins to make its first forward movement, and the knotter-frame, together with the knotter, will be swung laterally to draw the twine from its direct line by the following means: The segment-wheel N has a cam, N", secured to or formed upon its periphery, and has its upper portion beveled or inclined to press against a friction-roller, $t'$, secured to the end of an arm, $T^2$, forming part of the rod T', held in a fixed horizontal position in relation to the knotter-frame by being securely bolted to the yoke S. When the knotter and knotter-frame are in their normal positions, the friction-roller $t'$ will bear against the plate N" of the segment-wheel N; but when the segment-wheel is revolved to operate the knotter and knotter mechanism the inclined face of the plate N″ will press against the stationary friction-roller and swing the knotter-frame and parts secured thereto laterally from their normal position, which position they will resume when the segment-wheel is revolved in the opposite direction a sufficient distance for the roller to pass the inclined face of the plate N″. The knotter-frame is rocked upon the horizontal shaft S³, to rise and fall in a vertical plane, as the twine is wrapped around the knotter-jaws by the connecting-rod as it draws the segment-wheel N around in a line above the axis of the shaft S³, and allows it to fall again as it pushes in the opposite direction against the wheel and knotter-frame.

In order to equalize and steady the movement of the knotter-frame, so that it will rise and fall at a regular speed, it is not only pivoted by means of the yoke to the side walls of the stationary shoe G, but is connected with the foot-piece $g^2$ of said shoe by means of a link, V, the ends of which are looped to form a loose joint at its lower end with a looped strap, $g^3$, and to form a similar joint at its upper end with the end of an arm, V′, secured to the axle or shaft of the wheel N, by which means a double linked or equalized link connection is obtained between the knotter-frame and the crank L² of the knotter-operating shaft. It will be seen from the arrangement of links and jointed connections that as the main connecting-rod rises past its dead-centers to increase the speed of the upward movement of the knotter-frame upon its hinges the links V V′ will be thrown nearly in line and give but slight lift to the knotter-frame as it nears its dead-centers, and will serve to entirely check or limit the upper movement of said knotter binder-frame when its desired limit of upward movement is reached.

When it is desired to check the upward movement of the knotter-frame in a positive manner independently of the link V and arm V′, an adjustable bolt, Z, is screwed through the foot of the shoe G, and projects upward through a slot, o, in the lower plate of the knotter-frame, and is provided at its upper end with a cross-pin, Z′, that passes through it crosswise of the slot o, and limits the upward movement of the knotter-frame.

Figure 3:
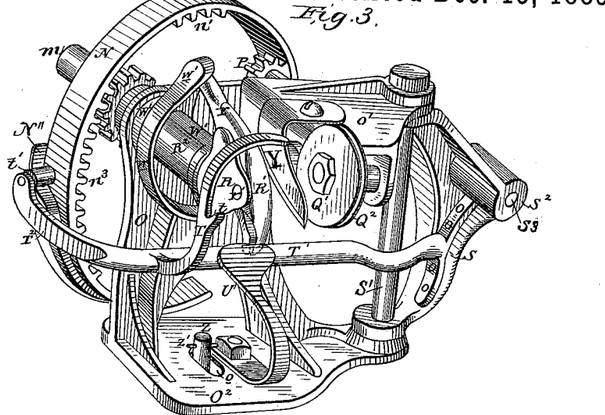
Fig. 3, an enlarged perspective view of the knotter and devices immediately connected therewith detached, and showing the knotter and other parts in their normal positions.
Figure 4:
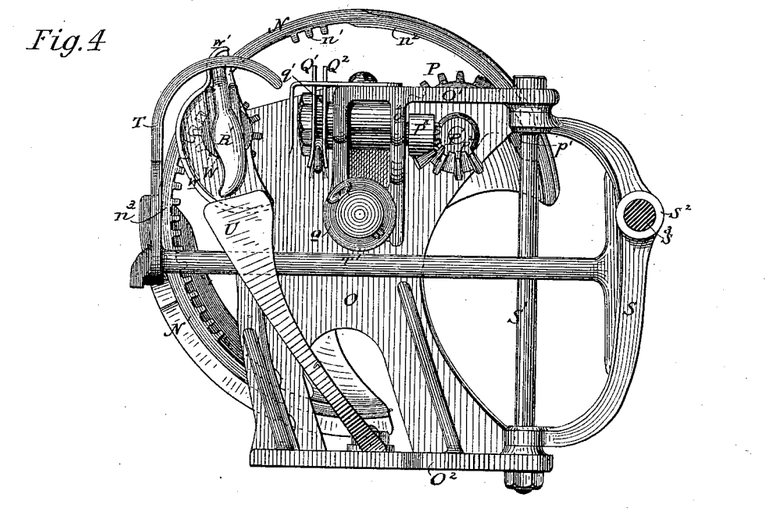
Fig. 4, a view in elevation of a still larger scale than the preceding figures.
Figure 5:
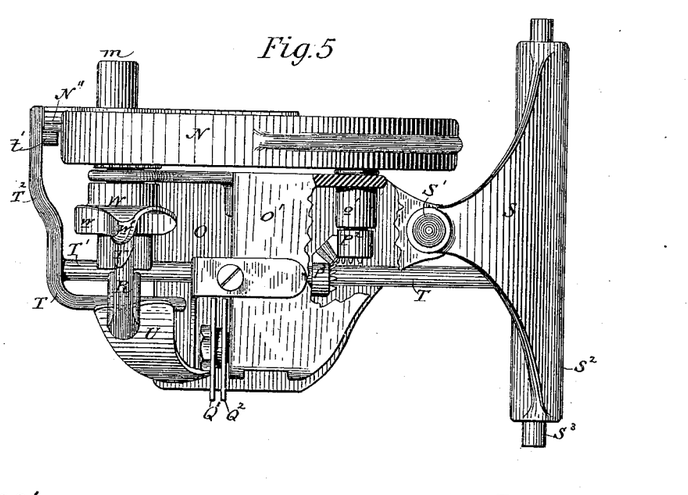
Fig. 5, a plan view of the same with a part of the knotter-frame broken away, to show the gearing for operating the gripper.

As shown in Figs. 1, 2, and 3 of the drawings, the slot o serves to admit of a free but limited lateral movement of the knotter-frame.

Figure 9:
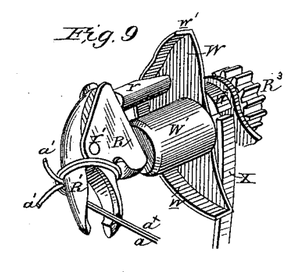
Fig. 9, a perspective view of the knotter as shown during the third and fourth parts of its forward movement, with the jaws open, ready to grip the twine outside of the portion that has been wrapped around it.

It will be seen that the lateral movement of the knotter-frame will be produced by the connecting-rod, as it pulls and pushes against the crank-pin m of the segment-wheel in a plane at the side of the bolt S′, upon which the knotter-frame swings. The knotter is revolved alternately in opposite directions about one and one-fifth revolution by the internal-toothed rack $n^3$ of the segment-wheel N, that gears with a pinion, R³, secured to the shaft R², that forms a part of the fixed jaw R of the knotter-bill. The knotter-jaw R′ is hinged to the fixed jaw R by a pin, I′, that permits said jaw to be opened or closed upon the said fixed jaw and revolve with it. The hinged jaw is formed with an arm, r, that projects over the shaft R² at an angle therewith, and extends back a sufficient distance to bear upon the inner surface of flange w of a cam-plate, W, that partly encircles the shaft R² and revolves or oscillates upon it. The arm r of the hinged jaw R′ is pressed upon its under side by a coiled spring, R⁴, concealed and held within a recess in the fixed jaw R of the knotter, and tends to keep the hinged jaw R′ securely pressed against the fixed jaw. The cam-plate W is of peculiar construction, and is concentric with the shaft at its lower portion, to insure the entrance of the arm r between the flange w and the shaft R², and also permit of the partial rotation of the knotter past its normal position in its forward movement, as will hereinafter appear, without operating upon the arm r to open the jaws. The cam-plate W then curves inward toward the shaft R² a sufficient distance to fairly open the hinged jaw by pressing upon the arm r, and holds it open, to fairly grip the twine, as shown in Fig. 9 of the drawings. The flange w of the cam-plate bulges outwardly from the shaft R² at w′, to allow the arm r and hinged jaw R′ to close smoothly and securely. The cam-plate W is prevented from moving past its normal position during the direct or forward movement of the knotter by a spring-plate, X, secured at one end to the binder-frame and arranged to abut against a cam-shaped lug, W², cast upon or forming a part of the cam-plate W. By this means the cam-plate will have a fixed position relative to a part of the forward movement of the knotter, and thus insure the action of the hinged jaw to be opened and closed upon the fixed jaw at proper intervals, and when said jaws are in the required position to be so effected. It will be seen that the cam-plate W is free to be moved backward by the reverse revolution of the knotter and arm, and returned to its normal position by the return movement of said arm. The hub W′ of the cam-plate W only encircles that part of the shaft outside of and opposite the flange w, which encircles the remaining portion of said shaft, and by means of the connecting-plates forms a continuous bearing around said shaft, and at the same time permits the arm r of the pivoted jaw to be drawn closely against the shaft R², and admits of a more compact arrangement, and enables the size of the parts to be materially reduced.

Figure 10:
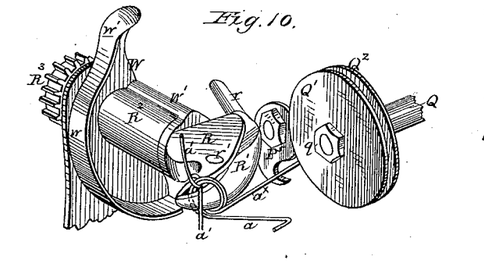
Fig. 10, a perspective view of the knotter-bill at the completion of the fifth and last part of its forward movement, when the cut end of the twine has been released from the gripper.
Figure 11:
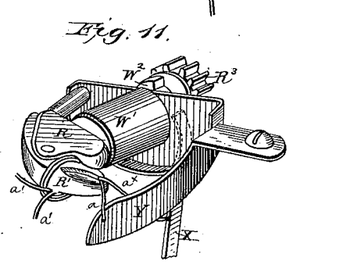
Fig. 11, a perspective view of the knotter in the third part of its backward movement, when the twine is being cut.
Figure 16:
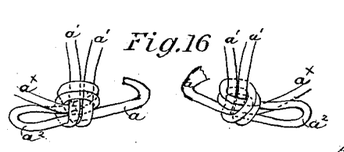
Fig. 16 represents diagrams showing the opposite sides of a knot formed by the herein-described inventions.

In Fig. 8 one end, a, of the twine is held by the gripper and cord-holder at the front of the knotter, and the portions a′ a′ of the twine pass around the bundle, the knotter having made about one-fifth of its forward movement and drawn the twine laterally from its direct line in position to wind the twine closely upon itself until the ends a will overlap the ends a′ a′, that pass around the bundle, at which point the jaws will be operated, as shown in Fig. 9, to grip the ends $a$ of the twine outside of the loop formed around the knotter. The jaws close upon the twine and continue their forward movement until the end $a$ of the twine held by the gripper is released therefrom, as shown in Fig. 10. The jaws continue to hold the twine in the last-described position, and the knotter begins its reverse movement. The gripper-hook is at once operated upon to press the uncut twine communicating with the binder-arm between the disks, and securely hold it until a second operation of the binding mechanism. The knotter continues to move in its reverse direction and draws the twine across the circular and inclined edge of the knife Y, secured to the binder-frame O, so that its blade will be arranged transversely to the line of the twine, as shown in Fig. 11. The twine is thus readily cut, and the knotter continuing to revolve in its reverse movement to its normal position, the bundle which has been raised above the knotter will draw upon the twine as the knotter-bills pass downward and away from it in the last part of its movement and strip the knot from the jaws. The end $a$ of the twine first gripped is longer than the end $a^\times$ last cut by the knife, as will be readily seen, from the knife Y being arranged between the knotter R and the gripper $P^5$, and when the knot is stripped from the jaws the shorter end of the twine will be drawn entirely through the loop, as shown in Fig. 16, while only a portion of the end $a^\times$ will be drawn through the loop that was formed around the knotter, and thereby form a second loop, $a^2$, the ends $a$ $a^\times$ being left or held upon opposite sides of the main or tying loop.

Figure 12:
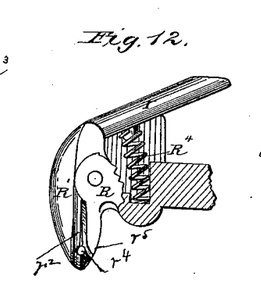
Fig. 12, a view in elevation showing a portion of the fixed jaw in section, to reveal the coiled spring for closing the hinged jaw.
Figure 13:
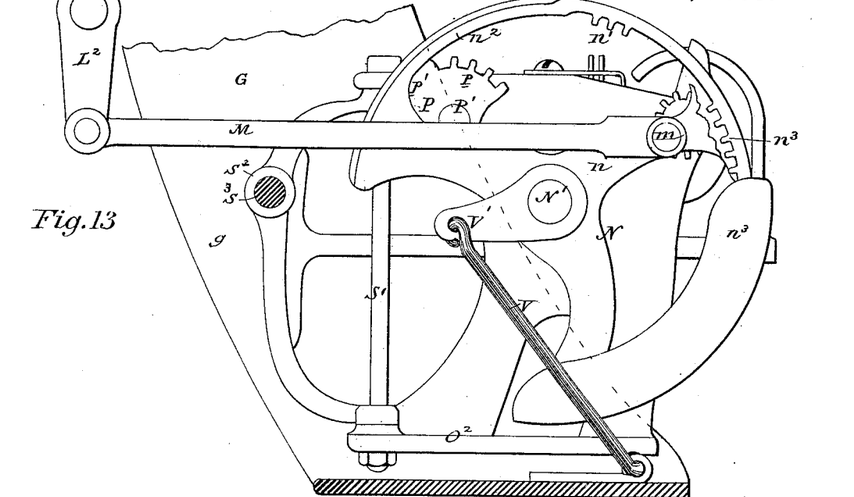
Fig. 13, an enlarged view, in elevation, of the lower part of the stirrup, showing the binder-frame in outline in its lower position, together with mechanism for limiting and regulating the upward movement of the binder-frame.
Figure 14:
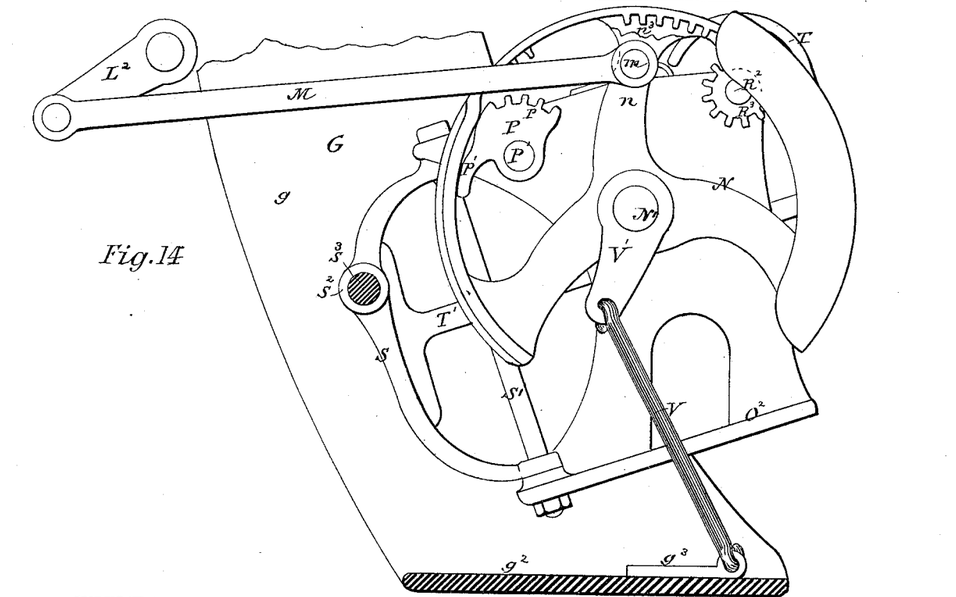
Fig. 14, a similar view of the same with the binder in its raised or tilted position.
Figures 17, 18, 19, 20:
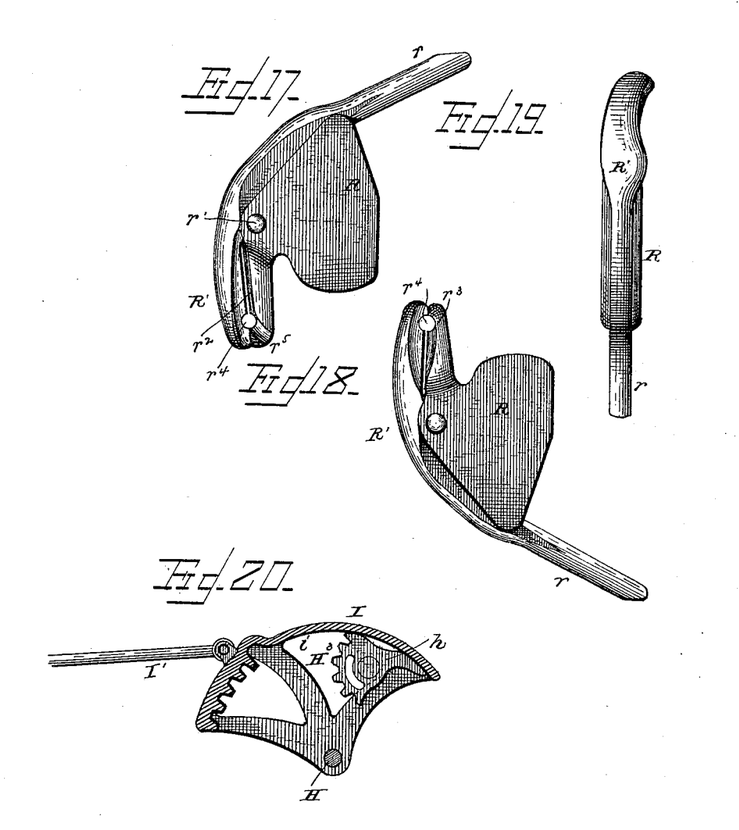
Figs. 17, 18, and 19 are enlarged views of the knotter.
Fig. 20 is a side view of segment rack and pinion, which operate the binder-arm.

In order that the twine may be freely stripped from the knotter, the points of the jaws are rounded, and the lips or meeting edges upon both sides of the jaws are grooved to form gutters $r^2$ $r^3$ upon each side of the knotter, into which the ends of the twine may rest and offer no frictional resistance to the passage of the loop over them when the knot is stripped. A small hole, $r^4$, formed partly in each jaw, permits the twine to pass between and across the jaws without spreading them, by which means a firm hold may be had upon the ends of the twine without having a tendency to pry them open. The fixed jaw R of the knotter has one of its lips $r^5$ grooved or flattened entirely across its face, as shown in Figs. 12 and 17, to form a solid rest across the lip for the twine while it is drawn across the blade of the knife, and thereby prevent the twine from forcing itself between the jaws while it is being cut. The knotter-jaws are hook-shaped, the concaved portion being upon the side farthest from the gripper when in its normal position, to enable the knotter to securely catch the twine in the first part of its movement, and the convexed portion be turned toward the bundle when the knot is stripped therefrom. A hood or shield, G', is secured to the main sill A, and together with the shoe G forms a covering for the knotting and holding mechanism, and protects it from injury and prevents the grain from choking the mechanism. A slot, $g^4$, in the casing allows the needle-arm and twine to pass through it to the knotting mechanism, and a friction-roller, $g^5$, prevents the twine from being cut or injured by the edge of the sheet-metal casing. The twine is released from the eye $o^3$, formed in the front part of the knotter-frame, as shown in Fig. 7, by the withdrawal of the needle-arm and after the twine has been caught by the grippers, the rounding edges of the slot leading to the eye being such that the twine will freely disengage itself by the withdrawal of the needle-arm, and its disengagement will be positively insured by the pressure of the rising grain, which will draw the twine taut and lift it entirely above and away from the hooked portion of the holder $o^4$. The cord is held in a sheet-metal cylinder, J, Figs. 1 and 15, that is secured to the rear rail, and has a central hole, $j$, in its end, through which the twine freely passes. A trough, $j'$, secured to the end of the cylinder, forms a passage, through which the twine may be drawn, and a bow-shaped tension-plate, $j^2$, made of spring metal to fit between the side walls and lengthwise of the trough, is held in place by a bolt, $j^3$, passing through, it formed with a screw-thread upon its end, and upon which a thumb-nut, $j^4$, may be adjusted to bear upon the upper side of the tension-spring with more or less force, and as the ends of the spring-plate $j^2$ press upon the twine at two points in its passage through the trough it thus insures an even tension upon it, and allows knotty places in the twine to freely pass first beneath one end and then beneath the other end of the tension-spring, and thereby secures at all times an even tension upon the twine. The twine passes from the trough $j'$, to and through the eye of a pin, $j^5$, screwed into the rear rail immediately behind and in line with the needle-arm. The twine then passes through a loop, $f$, in the needle-arm, then beneath a friction-roller, $f'$, in the eye of the needle-arm, and through said eye to the knotting mechanism.

The above-described mechanism passes the twine around the bundle and ties the knot. Any suitable scrolls and sprocket or star wheels of well-known construction may be employed to raise and compress the grain to a compact gavel within reach of the binder-arm, and need not be herein shown or described. The rear rail, E, is connected to the main shaft C by delivery-guides $D^2$, arranged upon opposite sides of the binder-arm, the lower ends of which are securely bolted to the rear rail, E, and the upper ends of which bear closely upon and are preferably bent around said shaft C, and serve to support the bundle when it has been raised over the main shaft as it is discharged from the machine. The bundle is lifted completely above and over the main shaft C by ejector arm $C^3$, secured to and revolving with the main shaft, as shown in Fig. 1. Two ejector-arms are employed upon each side of the binder-arm, and are arranged closely together to straddle each of the delivery-guides D², so that the guides will comb out or discharge any bunches of straw that may have become wound around the ejector arms or shafts and keep the said parts at all times free from such entanglement.

Various modifications can be made in the construction of many of the parts above described without departing from my invention, and it is obvious that the knotting mechanism herein described may be employed in connection with a reaping-machine, instead of a gleaner.

The entire knotting mechanism is secured to a shoe, which may be readily removed from the machine at any time for reapers, for protection from the weather, or for safe keeping, while the remaining parts of the machine, being strong and simple, will not need such special care.

In operation one end of the twine is held by the gripper as the grain is raised or compressed against it, and the twine is drawn from the spool through the tension device and end of the binder-arm until the entire quantity of grain to form the bundle has been brought within reach of the binder-arm, while it is withdrawn and the binder is in its normal position, as shown in the main figures of the drawings, and wherein both the tangent-rack and segmental-rack are at rest, the tangent-rack being at the full end of its throw on its flat dead-surface and the segmental rack upon a quarter-turn of its crank in a forward movement, ready to bring its tooth portion immediately in operation and push forward the binder-arm to embrace the bundle and carry the twine across the machine to the knotting mechanism. The binder-arm is moved forward rapidly by the accelerated speed given to its pinion by the segmental rack, and the dead-surface of the tangent-rack holds its pinion and the knotter mechanism at rest until the binder-arm completes its movement and presents the twine to the retainer-hook in the rear of the gripper, (shown in Fig. 7,) and also to the retainer-hook on the twine-looper, (shown in Fig. 8,) below the knotter and gripper in a parallel line with the end of the twine. An interval of apparent rest is then given to the binder-arm, while the cranks are passing their dead-centers and the twine sufficiently taut to be wound firmly upon the knotter-hook. The tangent-rack at this point brings its toothed portion to act upon the pinion, and starts the knotter immediately in operation. The knotter-head makes about one and one-quarter revolution each way, which we will divide into and designate as its first, second, third, fourth, and fifth parts of both the forward and backward movements. The knotter-head now makes the first part of its forward movement, as shown in Fig. 8, and by the swinging of the knotter-frame draws the twine laterally from its direct line held by the retainer-hooks, and partially winds it around the jaws of the knotter. By the action of the knotter in winding the twine around itself the knotter-frame is raised or swung upon its pivots toward the bundle sufficiently to slacken the twine to form the knot without drawing it from the bundle. The second part of the forward movement of the knotter completely wraps the twine around the head, the jaws of which are kept closed by the pressure-spring, and arm of the hinged jaw is carried fairly into the cam-plate. The cam-plate is held firmly in place by the elastic pawl pressing against the projecting tooth on its hub, and during the third part of the forward movement of the knotter-head the hinged jaw is opened by the arm pressing against the eccentric or cam surface of the plate until the jaws shall have fairly passed upon the opposite sides of the twine, as shown in Fig. 9, the crank for operating the segment-rack will then have passed its dead-center and will move the needle-arm slowly backward for an instant, until in the fourth part of the forward movement of the knotter-head the arm of the hinged jaw shall have passed the depressing-flange of the cam-plate and the jaw closed to grasp the twine. The needle-arm, continuing to move slowly backward, slackens the twine while the knotter-head makes the fifth and last part of its forward movement, during which time the gripper-hook is drawn back by the mutilated and segmental gearing, to release the end of the cord from the gripper and allow it to be completely drawn therefrom by the final forward or fifth movement of the knotter-head, during which movement the disks, being free to revolve, move backward with the gripper-hook, to release the twine therefrom. At the end of the forward movement of the knotter-head the shaft C will have nearly completed a half-revolution, and the crank is upon its dead-center, ready to immediately reverse the movement of the pinion by the forward thrust of the tangent-rack, and is ready to start the backward movement of the knotter-head, to grip and cut the twine and strip the knot from the knotter-jaws. During the first part of the backward movement of the knotter-head the needle-arm is swept rapidly back to its normal position by the accelerated speed imparted by the segment rack and pinion, to disengage itself from any straw that may have been raised and packed beneath it, in which position it is retained by the dead-surface of the segment-rack until a new bundle is to be bound. The knotter-head makes the first and second parts of its backward movement to deliver the twine freely to the gripper-hook, which is simultaneously raised to take up the slackened twine and compress it between the elastic disks, where it is firmly held. In the second part of the backward movement the arm of the fixed jaw of the knotter-head strikes the upper end of the cam-plate and continues to move it during the remainder of the backward movement until the cam-plate shall have made a complete revolution and is returned to its normal position. The overlapping portions of the gripper-hook and disks are held at one side of the central line of the knotter-jaws, and together with the inclined or curved edge of the knife serve to draw the twine across the grooved lip of the fixed jaw of the knotter-head, so that the jaws are not opened by the twine while it is being cut in the third part of the backward movement of the knotter-head. The fourth part of the backward movement completely strips the knot from the knotter-head by pulling the shorter or cut end of the twine completely through the portion wrapped around the knotter-head and forming a loop of the longer or released end of the twine, the ends being held in the grooved faces of the knotter-head while the twine is freely drawn over them and off from its curved and tapering jaws. The fifth and last part of the backward movement returns the knotter to its normal position, ready for a second operation. As the tangent-rack that imparts motion to the knotter mechanism has its flattened surface presented to the pinion during the latter part of its return movement, the shaft is moved backward sufficiently to completely the fourth and fifth parts of the backward movements of the knotter-head by the tilting or rocking of the secondary shaft actuated by the crank in its upward movement, as shown in Fig. 1. As the rising grain presses against the twine after the needle-arm has been withdrawn, the twine will be drawn around the curved or cam-shaped surface of the retainer-hook at the rear end of the knotter-frame, and thereby withdrawn therefrom. The cord is at the same time and by the same means drawn up under the knotter and prevented from escaping from its proper position under the knotter-head by the stationary guide. At that part of the revolution of the shaft, the ejector-arms begin to raise the bundle, and thereby insure the stripping of the knot from the knotter-head, and at the completion of its revolution will carry away and eject the bound bundle from the machine.

I claim herein as my invention and desire to secure by Letters Patent—

1. The combination of the revolving main shaft, a binder-arm loosely journaled thereon, and intermediate mechanism for imparting a vibrating motion from the main shaft to the binder-arm, substantially as described.

2. The combination of a revolving main shaft, a binder-arm journaled thereon, the knotting mechanism, and intermediate mechanism for vibrating the binder-arm and operating the knotting mechanism intermittently from the continuously-revolving shaft, substantially as described.

3. The combination of the continuously-revolving main shaft, the binder-arm loosely journaled thereon, the binder-arm-operating shaft, the cranks and pitman for connecting the shafts, and a crank and pitman for connecting the binder-arm-operating shaft and binder-arm, substantially as described.

4. The combination of the revolving main shaft with shafts for operating the binder-arm and knotting mechanism, said shafts driven by cranks secured to the opposite ends of the main shaft, substantially as described.

5. The combination of the revolving main shaft, the binder arm shaft, the knotting-mechanism drive-shaft, the connecting-rods connecting the latter shafts with the main shaft, and gearing between the said rods and shafts to operate the binder-arm and knotter mechanism intermittently at an accelerated speed, substantially as described.

6. The combination of the revolving main shaft, its crank, the connecting-rod, the pivoted segment formed with toothed and delay surfaces, a segment-pinion formed with similar toothed and delay surfaces on the end of the binder-arm shaft, the crank, the link, and the binder-arm, substantially as described, to impart an intermittently-accelerated movement to the binder-arm.

7. The combination of the revolving main shaft, its crank, the connecting-rod provided with a rack and delay surface, the segment-pinion formed with toothed and delay surfaces, the knotter-mechanism-operating shaft, and mechanism for imparting intermittent accelerated motion to the knotter-mechanism-operating shaft, substantially as described.

8. The combination of the revolving main shaft, the binder-arm-operating shaft, the crank on the latter shaft, the connecting-link and the vibrating binder-arm, and the knotting mechanism, combined and arranged, substantially as described, to form a cut-off or barrier between the binder-arm-operating shaft and knotting mechanism, to intercept the rising grain during the operation of the knotting mechanism, substantially as described.

9. The combination, with an oscillating gripper-hook, of two oscillating disks arranged upon a shaft parallel with the hook-shaft and independently of the gripper-hook for gripping and releasing the twine, substantially as described.

10. The combination, with an oscillating gripper-hook, of two freely-moving disks, between which the cord is carried by the hook, substantially as set forth.

11. The combination of the oscillating gripper-hook, the gripper-disks secured to a freely-revolving shaft for gripping the twine when revolved in one direction and ungripping the same when moved in the opposite direction, substantially as described.

12. The combination of the oscillating segment gear-wheel for operating the knotter mechanism, formed with a delay-surface, the segment-pinion on the gripper-shaft formed with a similar delay-surface, and the gripper connected therewith to receive an intermittent oscillating movement therefrom, substantially as described.

13. The combination of an oscillating gear-wheel, a pinion revolved alternately in opposite directions thereby, the pinion-shaft, and the segment bevel-pinions connecting said shaft and the shaft of the oscillating gripper, substantially as and for the purpose described.

14. The combination of the oscillating gripper-hook, the oscillating disks, and a rubber washer secured upon the shaft of the disks to bear against them and form an elastic cushion, substantially as and for the purpose described.

15. The combination of the binder-arm, the gripper, and the retaining-notch in front of and in line with the gripper, to hold the twine up to the gripper while the binder-arm is receding and the moving jaw of the gripper is moved forward to clamp the twine, substantially as described.

16. The combination of the needle-arm, the gripper, and the plate having a retaining-notch arranged relatively to the gripper, as described, and a slot in the plate, formed with curved walls, to permit the twine to be released from said notch, substantially as described.

17. The combination of the revolving knotter, the gripper arranged upon one side thereof, and the vertical twine-guiding rod formed with a projecting lip to hold the twine, and curved above the lip to follow the path of the revolving knotter, substantially as described.

18. The combination of the rotating knotter, a laterally-swinging knotting-mechanism frame, and means for swinging said frame laterally to bend the twine from its direct line over the knotter, substantially as described.

19. The combination of the rotating knotter, a laterally-moving knotting-mechanism frame, and a twine-guiding rod secured independently of the knotting-mechanism frame, to hold the twine while a portion of it is drawn from its direct line by the lateral movement of the knotting-mechanism frame, substantially as described.

20. The combination of the pivoted knotting-mechanism frame, a revoluble knotter gear-wheel for operating the knotter, provided with a cam-plate upon its face or rim, and a friction-roller arranged to bear against the cam-plate and impart a lateral movement to the knotting-mechanism frame, substantially as described.

21. The combination of the rotating knotter, a laterally-swinging knotter-mechanism frame formed with a slot in its lower plate, and the bolt secured to a fixed frame and passing through the said slot to limit the movement of the knotter-frame, substantially as described.

22. The revolving knotter supported in a vertically-swinging knotting-mechanism frame, whereby the knotting and holding mechanism may be drawn toward the bundle while looping the twine to form the knot, substantially as and for the purpose set forth.

23. The combination of the shoe, the vertically-swinging knotting-mechanism frame pivoted thereto, and a stop-bolt secured to the shoe and arranged to check or limit the movement of the knotter-mechanism frame, substantially as described.

24. The combination of the shoe, the vertically-swinging knotter-mechanism frame, the revolving knotter, the oscillating driving-wheel, and a link pivoted at one end to the shoe and at the other end to the driving-wheel at a point eccentric to its axis, and the pitman and crank-arm for operating the driving-wheel to secure a uniform vertical movement of the knotter-mechanism frame, substantially as described.

25. The combination of the knotter-mechanism frame carrying a revolving knotter and pivoted to a vertically-swinging yoke, the pivot adapting the frame to swing laterally in the yoke, whereby the knotter may have both a vertical and transverse or lateral movement, substantially as described.

26. In a grain-binder, the combination of the laterally-swinging knotting-mechanism frame, an oscillating segment gear-wheel, with the pinion, knotter-shaft, and knotter caused to revolve alternately in opposite directions to form the knot, substantially as described.

27. The combination of the knotter-mechanism frame, the oscillating segment-gear, the revolving knotter, and an oscillating segment-pinion for operating the gripper, substantially as described.

28. The combination of the knotting-mechanism frame, the oscillating segment-gear provided with a delay-surface, the revolving knotter, and the oscillating segment-pinion provided with a delay-surface to be operated by the segment-gear in its forward and backward movement and receive therefrom an accelerated intermittent oscillating motion in forming the knot, substantially as described.

29. In a grain-binder, the combination of the knotter and mechanism to revolve the same alternately in opposite directions, and an intermittingly-operating gripper and mechanism for operating it, as described, so as to release the stub-end of the twine during the forward movement of the knotter and grip the uncut twine during its backward movement, substantially as described.

30. The combination, with a revolving knotter, its operating mechanism, an intermittingly-operating gripper, and mechanism for operating it, substantially as described, whereby the gripper will grip the twine while the knotter is moving toward the gripper to give a slack cord to be gripped, as set forth.

31. The combination of the knotter, caused to revolve alternately in opposite directions, the intermittently-oscillating gripper, and stationary knife arranged between the gripper and the knotter, against which the twine is cut in the backward movement of the knotter, substantially as described.

32. In a grain-binder, the knotter and mechanism to revolve the same alternately in opposite directions, said knotter provided with a hinged jaw having a heel-extension, in combination with a semi-rotating cam-plate encircling the shaft, arranged at its lower portion concentric with the shaft, for permitting the heel-extension to pass inside the flange of the cam to open the jaw, and to revolve with the knotter in the opposite direction without opening the jaw, as set forth.

33. The combination of the revolving knotter, provided with a hinged jaw having a projecting heel, the knotter-shaft, and a plate that completely encircles the shaft, and which has a cam-flange, and a hub that partially encircles the shaft, arranged on the opposite side of the shaft from the flange of the cam, to allow the heel of the jaw to be driven closely to the shaft by the cam-flange, substantially as and for the purpose set forth.

34. The knotter, formed with a grooved or flattened surface across one of its jaws to hold the twine transversely thereto, and preventing it from slipping out from between the jaws when the twine is cut, substantially as described.

35. In a tension device for grain-binders, the combination of the twine-box, the trough secured thereto, the bow-shaped spring, and the adjustable bolt secured midway of the spring, to press the twine between the ends of the spring and trough, substantially as described.

36. The combination and arrangement of the front sill, the rear sill, the continuously-rotating main shaft, the binder-arm freely journaled to and oscillated thereon, and ejector-arms secured to and revolving with said shaft, substantially as and for the purpose described.

37. The combination of the front sill, the rear sill, the main shaft, the bundle-delivery guides or plates connected to the rear sill and main shaft, and ejector-arms, arranged in pairs closely upon opposite sides of the delivery-plates, to straddle them, substantially as and for the purpose described.

In testimony whereof I have hereunto set my hand this 11th day of June, A. D. 1883.

MOSES G. HUBBARD, JR.

Witnesses:
WARREN C. STONE,
JAS. W. SCHRACK.